United States Patent [19]

Kirschey

[11] Patent Number: 5,522,747
[45] Date of Patent: Jun. 4, 1996

[54] THREE-STAGE SHAFT COUPLING

[75] Inventor: Gerhard Kirschey, Wuppertal, Germany

[73] Assignee: Centa-Antriebe Kirschey GmbH, Haan, Germany

[21] Appl. No.: 384,264

[22] Filed: Feb. 3, 1995

[30] Foreign Application Priority Data

Feb. 4, 1994 [DE] Germany ............... 44 03 477.6

[51] Int. Cl.$^6$ ............................................. B63H 23/34
[52] U.S. Cl. ................................. 440/83; 123/192.2
[58] Field of Search ........................... 440/52, 75, 83, 440/112; 464/68, 88, 98, 89; 123/192.2

[56] References Cited

U.S. PATENT DOCUMENTS

| | | | |
|---|---|---|---|
| 3,399,647 | 9/1968 | Alexander et al. | 440/75 |
| 4,929,204 | 5/1990 | Shiozawa | 440/112 |
| 4,938,723 | 7/1990 | Yoshimura et al. | 440/52 |
| 5,282,444 | 2/1994 | Ito et al. | 123/192.2 |

*Primary Examiner*—Jesus D. Sotelo
*Attorney, Agent, or Firm*—Herbert Dubno; Andrew Wilford

[57] ABSTRACT

A three-stage coupling has a driven input element and an output element adapted to be drive to a load and coaxial with the input element. The third stage has an annular input side and fixed to the input element, an annular output side adjacent and coaxial with the input side, and a relatively soft elastomeric ring secured between the input and output sides. The third stage defines a cavity on the axis and has ends defining axially spaced end planes perpendicular to the axis. The second stage is substantially received in the cavity between the planes and has an output side and fixed to the output element, an input side adjacent the second-stage output side and fixed to the third-stage output side, and a relatively hard and elastomeric body between the second-stage input and output sides. Interengageable formations between the second-stage input and output sides couple same together via the second-stage body only after the second-stage input and output sides have been relatively rotated through a predetermined angle. The first stage is substantially received in the cavity between the planes and has an output side and fixed to the output element, an input side adjacent the first-stage output side and coaxial with the first-stage output side and fixed to the third-stage output side, and a relatively soft and elastomeric body between the first-stage input and output sides.

6 Claims, 2 Drawing Sheets

THREE-STAGE SHAFT COUPLING

FIELD OF THE INVENTION

The present invention relates to a shaft coupling. More particularly this invention concerns a three-stage coupling of the type used between a marine engine and the boat propeller.

BACKGROUND OF THE INVENTION

A standard coupling used between a prime mover constituted by a marine engine and a load constituted by a boat propeller has three stages connected between an input element normally flanged to the flywheel of the engine and an output element that is a hub on a shaft carrying the propeller. The first, second, and third stages are set so that they operate sequentially one after another, first stage first and third stage last, and the second and third stages are connected in parallel to each other and in series with the first stage. The third stage is much softer or easily deformed than the first stage which in turn is softer than the second stage, and formations in the second stage create a lost motion or delay so that the hard second stage only is effective after this lost motion or delay is overcome. Thus as the load is increased to start with the coupling will be relatively soft, with the weak third stage responding. Then the relatively hard second stage will come into action so that at the end the first stage, which is harder than the third stage and softer than the second stage, determines the characteristics of the coupling.

Such a coupling, marketed as a "MerCruiser," is intended to eliminate so-called gear hammering or gear clatter. Such noise is particularly present at low RPM with a diesel engine. With this system, therefore, the input and output elements are indirectly interconnected by the medium-hard elastomeric body of the first stage. When idling or at low engine speed all force is transmitted through this first stage from the engine to the propeller. Only at higher speed does the harder second stage come into action for a more solid connection between the engine and the prop.

To this end the second stage is formed as a pair of coaxial members one of which is formed with an array of axially projecting pins and the other of which is formed with an array of sector-shaped slots into which the pins extend and in which the pins are limitedly angularly movable. Relatively hard elastomeric bodies are provided on the pins or in the slots so that when the pins come to the ends of the slots they rotationally couple the members together. The first stage is connected in parallel to this second stage and is, as mentioned above, substantially softer than the second stage so that when the torque being transmitted through the coupling exceeds a predetermined relatively low level, the second coupling comes into action, and thereafter the response characteristic of the coupling is determined by the series connected first stage. Thus the second stage in effect is phase-shifted relative to the first stage. The characteristic curve of this coupling therefore starts out flat and become quite steep once the second coupling's lost motion is overcome.

The third stage of this known coupling is normally formed by a rubber ring vulcanized onto the hub of the output shaft and tightly surrounded by a metallic ring which is connected to the other two stages that are in parallel. The entire assembly is therefore fairly bulky and, in fact, of substantial axial length. Furthermore the coupling is fairly expensive to manufacture and install.

OBJECTS OF THE INVENTION

It is therefore an object of the present invention to provide an improved.

Another object is the provision of such an improved three-stage shaft coupling which overcomes the above-given disadvantages, that is which is of simple, small, and economical construction.

SUMMARY OF THE INVENTION

A three-stage coupling has according to the invention an input element adapted to be connected to a prime mover and rotated thereby about an axis and an output element adapted to be connected to a load and rotatable about the axis. The third stage has an annular input side rotatable about the axis and fixed to the input element, an annular output side adjacent and coaxial with the input side, and a relatively soft elastomeric ring secured between the input and output sides. The third stage defines a cavity on the axis and has ends defining axially spaced end planes perpendicular to the axis. The second stage is substantially received in the cavity between the planes and has an output side rotatable about the axis and fixed to the output element, an input side adjacent the second-stage output side and fixed to the third-stage output side, and a relatively hard and elastomeric body between the second-stage input and output sides. Interengageable formations between the second-stage input and output sides couple same together via the second-stage body only after the second-stage input and output sides have been relatively rotated through a predetermined angle. The first stage is substantially received in the cavity between the planes and has an output side rotatable about the axis and fixed to the output element, an input side adjacent and coaxial with the first-stage output side and fixed to the third-stage output side, and a relatively soft and elastomeric body between the first-stage input and output sides.

This coupling is extremely compact. Moving the third stage from the output side to the input side allows it to almost wholly surround and contain the first and second stages The large diameter of the third stage ensures better ventilation and cooling of its rubber ring. Nonetheless the compact coupling according to the invention will function like the above-described MerCruiser coupling.

According to the invention the input and output sides of the third stage are generally flat annular disks lying generally on the respective planes so that the disks can move limitedly radially of each other with deformation of the third-stage ring. Such radial give is very useful in a marine-drive system where some misalignment is fairly common.

One of the sides of the first stage according to the invention is formed with a polygonal-section recess and the other side of the first stage is of polygonal section and is loosely received in the recess. The first-stage body is a plurality of elastomeric blocks braced radially between an inner surface of the recess and an outer surface of the other side of the first stage.

Further in accordance with this invention one of the second-stage sides is formed offset from the axis with at least one axially open and angularly elongated slot and the other second-stage side is formed offset from the axis with a pin extending axially into the slot and received with substantial play therein.

The input element lies almost wholly between the planes and in fact so can the output element, so that the entire three-stage coupling is indeed very compact.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
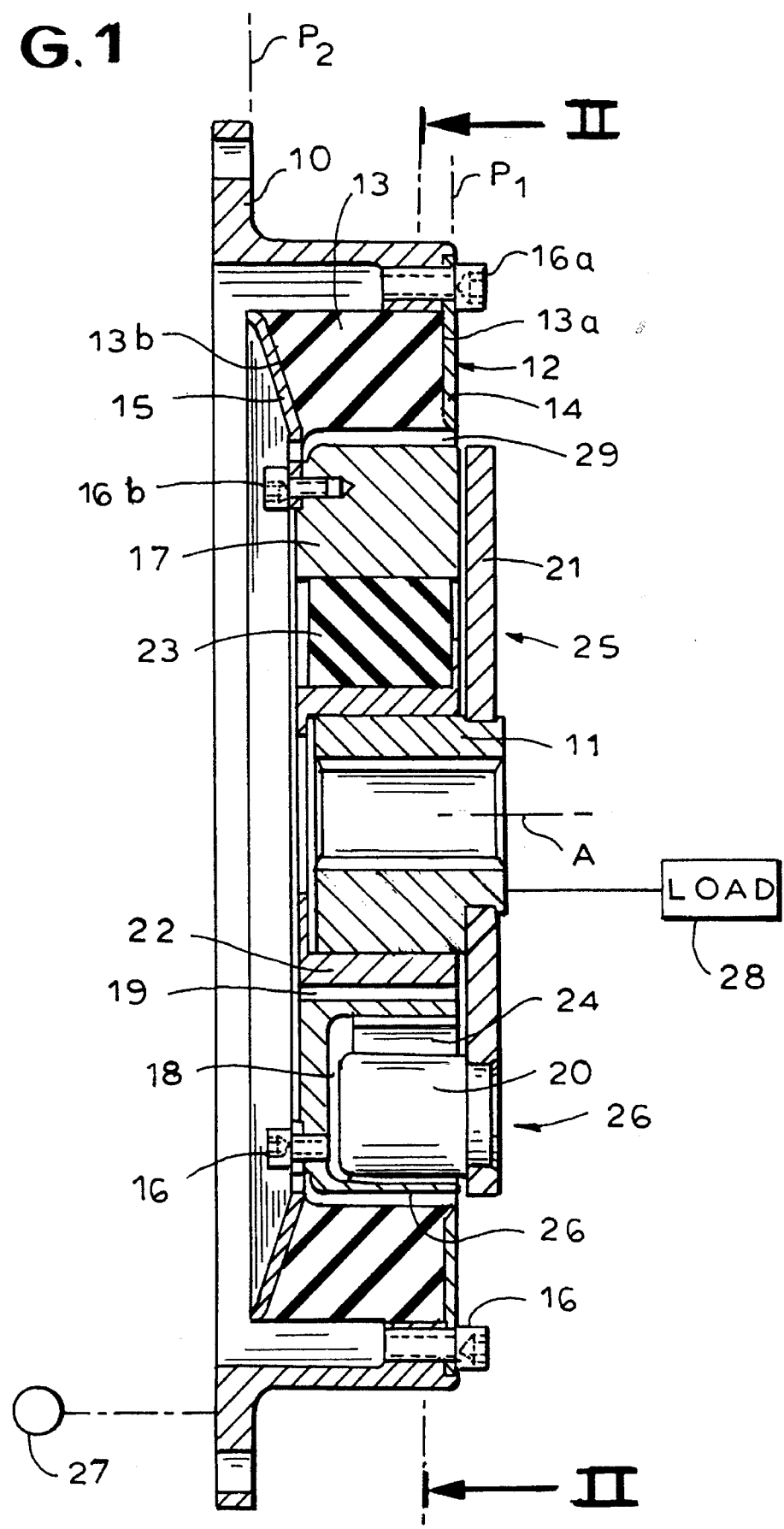
FIG. 1 is an axial section taken along line I—I of FIG. 2.
Figure 2:
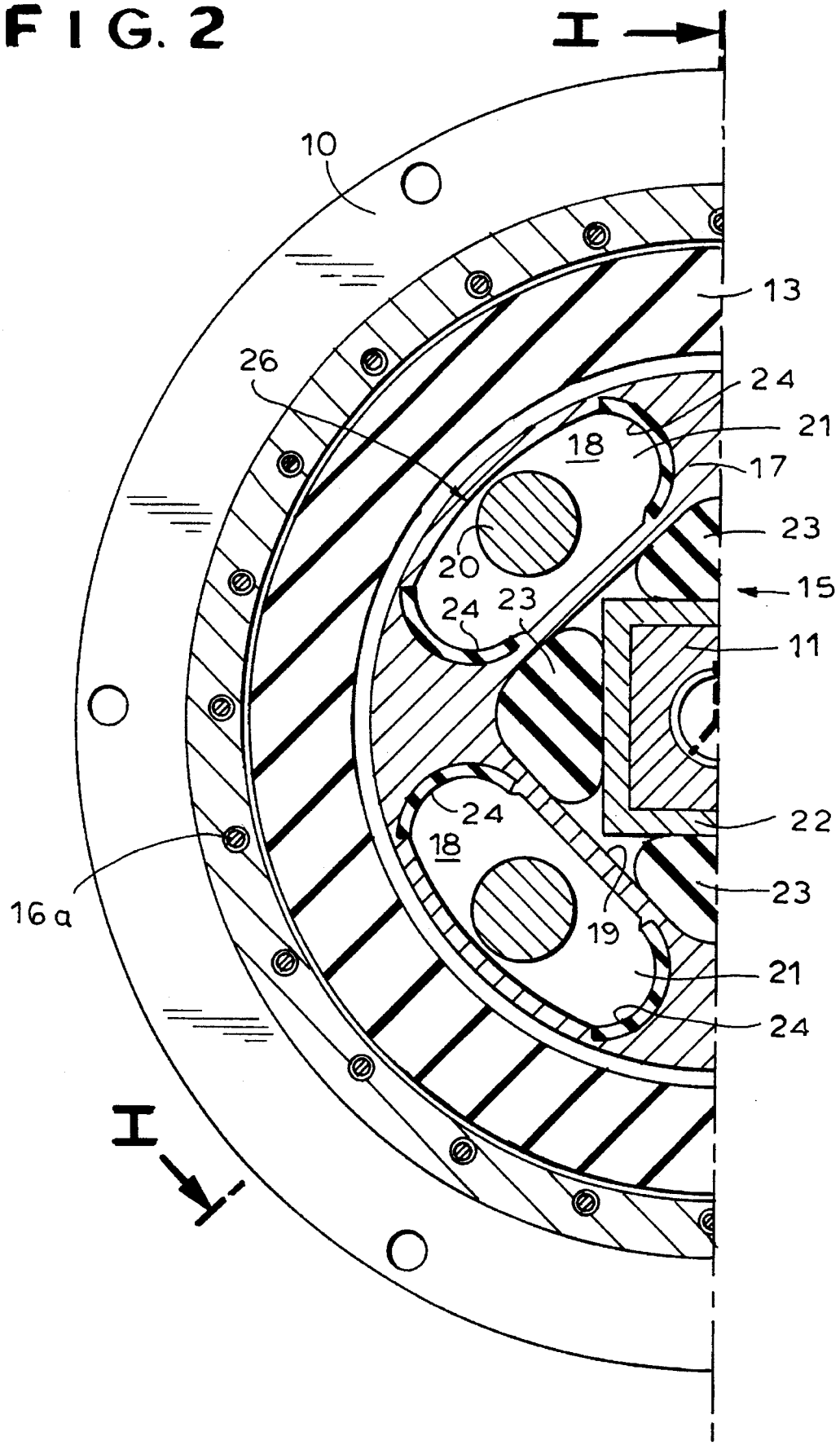
FIG. 2 is a partial cross section taken along line II—II of FIG. 1.

As seen in FIGS. 1 and 2 a coupling according to this invention has an input member 10 formed as a flange connected to the flywheel of a marine engine 27 acting as a prime mover and an output member 11 formed as a hub on a shaft connected to a load 28 formed by a propeller. The input and output members 10 and 11 are both centered on and rotatable about a common axis A.

A third stage 12 of the coupling has an elastomeric ring 13 having a rear face 13a to which is vulcanized a metal ring 14 secured by bolts 16a to the input member 10 and constituting an input side of the third stage. The ring 13 has a front face 13b to which is vulcanized a dished washer 15 constituting an output side of the third stage. The stage 12 therefore defines a cylindrical cavity 29 centered on the axis A and bounded at its axial rear end by a plane P1 perpendicular to the axis A and at its front end by a plane P2 also perpendicular to the axis A.

A second stage 26 of the coupling has an input side formed by a casting 17 secured by bolts 16b to the washer 15 and formed with four angularly equispaced and angularly elongated slots 18. Respective pins 20 extending axially from a plate 21 forming the output member and fixed to the hub 11 extend into the slots 18 whose ends are provided with elastomeric liners 24. When the coupling is under no load the pins 20 are as illustrated in the middles of the slots 18, out of contact with the end linings 24.

A first stage 25 of the coupling is constituted by a square-section fitting 22 on the hub 11 that engages in a larger square-section recess 19 formed in the casting 12, and by elastomeric bodies 23 wedged between the outer faces of the fitting 22 and the corners of the recess 19. These bodies 23 are quite soft compared to the ring 13.

Both the first stage 25 and the second stage 26 are virtually completely contained in the cavity 29 between the planes P1 and P2. Thus this assembly is axially extremely short.

The coupling functions as follows:

Assuming that the load 28 is extremely small, that is there is little force resisting rotation of the output member 11, when the prime mover 27 starts there will be little or no deformation of the medium-hard body 13 so that its input and output sides 14 and 15 will not be significantly angularly displaced relative to each other. The input side 19 of the third stage 25 will move angularly somewhat relative to the output side 22 of this stage 25, with deformation of the bodies 23, but not enough for the pins 20 to move into contact with their end linings 24. Thus during this starting or low-torque phase, the characteristic of the coupling will be a flat curve determined mainly by the composition of the bodies 23.

As the transmitted torque increases the input and output parts 17 and 22 of the first stage 25 will move angularly relative to each other until the pins 20 seat at the ends of the slots 18, thereby effectively eliminating the effect of the first stage 25. From this point the hardness of the end liners 24 and, more importantly, of the softer ring 13 will determine the operating characteristic of the coupling which will, therefore, be somewhat stiffer.

When the motor 27 slows and/or the transmitted torque increases, the above-described sequence takes place in reverse, with the stage 26 first dropping out and so on.

I claim:

1. A coupling comprising:
   an input element adapted to be connected to a prime mover and rotated thereby about an axis;
   an output element adapted to be connected to a load and rotatable about the axis;
   a third stage having
      an annular input side rotatable about the axis and fixed to the input element,
      an annular output side adjacent and coaxial with the input side, and
      a relatively soft elastomeric ring secured between the input and output sides, the third stage defining a cavity centered on the axis and having ends defining end planes that are axially spaced and perpendicular to the axis;
   a second stage substantially received in the cavity between the end planes and having
      an output side rotatable about the axis and fixed to the output element,
      an input side adjacent the second-stage output side and fixed to the third-stage output side,
      a relatively hard and elastomeric body between the second-stage input and output sides, and
      means including interengageable formations between the second-stage input and output sides for coupling same together via the second-stage body only after the second-stage input and output sides have been relatively rotated through a predetermined angle; and
   a first stage substantially received in the cavity between the end planes and having
      an output side rotatable about the axis and fixed to the output element,
      an input side adjacent and coaxial with the first-stage output side and fixed to the third-stage output side, and
      a relatively soft and elastomeric body between the first-stage input and output sides.

2. The coupling defined in claim 1 wherein the input and output sides of the third stage are generally flat annular disks lying generally on the respective end planes, whereby the disks can move limitedly radially of each other with deformation of the third-stage ring.

3. The coupling defined in claim 1 wherein the one of the sides of the first stage is formed with a polygonal-section recess and the other side of the first stage is of polygonal section and is loosely received in the recess, the first-stage body being a plurality of elastomeric blocks braced radially between an inner surface of the recess and an outer surface of the other side of the first stage.

4. The coupling defined in claim 1 wherein one of the second-stage sides is formed offset from the axis with at least one axially open and angularly elongated slot and the other second-stage side is formed offset from the axis with a pin extending axially into the slot and received with substantial play therein.

5. The coupling defined in claim 1 wherein the input element lies almost wholly between the end planes.

6. The coupling defined in claim 1 wherein the output element lies almost wholly between the end planes.

* * * * *